(12) United States Patent
Whitehead

(10) Patent No.: US 10,203,436 B2
(45) Date of Patent: Feb. 12, 2019

(54) METHOD AND APPARATUS FOR IMPROVED COLOR FILTER SATURATION

(71) Applicant: CLEARink Displays LLC, Santa Clara, CA (US)

(72) Inventor: Lorne A. Whitehead, Vancouver (CA)

(73) Assignee: CLEARink Displays, Inc., Fremont, CA (US)

( * ) Notice: Subject to any disclaimer, the term of this patent is extended or adjusted under 35 U.S.C. 154(b) by 0 days.

(21) Appl. No.: 14/891,783

(22) PCT Filed: May 15, 2014

(86) PCT No.: PCT/US2014/038091
§ 371 (c)(1),
(2) Date: Feb. 5, 2016

(87) PCT Pub. No.: WO2014/189751
PCT Pub. Date: Nov. 27, 2014

(65) Prior Publication Data
US 2016/0231475 A1    Aug. 11, 2016

Related U.S. Application Data

(60) Provisional application No. 61/826,236, filed on May 22, 2013.

(51) Int. Cl.
G02F 1/167    (2006.01)
G02B 5/20     (2006.01)
(Continued)

(52) U.S. Cl.
CPC ............. *G02B 5/13* (2013.01); *G02B 5/136* (2013.01); *G02B 26/02* (2013.01);
(Continued)

(58) Field of Classification Search
CPC .......... G02B 5/13; G02B 5/136; G02B 5/128; G02B 5/201; G02B 26/02; G02B 26/005;
(Continued)

(56) References Cited

U.S. PATENT DOCUMENTS 3,792,308 A    2/1974  Ota et al.
3,919,031 A    11/1975 White
(Continued)

FOREIGN PATENT DOCUMENTS

AT    333109 T     8/2006
CA    2292441 C    7/2002
(Continued)

OTHER PUBLICATIONS

International Search Report and Written Opinion dated Apr. 13, 2016 for PCT Application No. PCT/US2015/066980.
(Continued)

*Primary Examiner* — Collin X Beatty
(74) *Attorney, Agent, or Firm* — Dianoosh Salehi

(57) ABSTRACT

A reflective image display comprising of a reflection enhancing layer comprising of a plurality of approximately spherical indentations is placed adjacent a sheet comprising of a plurality of hemispherical protrusions. The radii of curvature of the spherical indentations substantially coincides with the center of curvature of the adjacently located hemispheres to enhance the white paper-like appearance of the display while efficiently enabling optional color filters to yield saturated color.

21 Claims, 6 Drawing Sheets

(51) Int. Cl.
*G02B 5/13* (2006.01)
*G02B 5/136* (2006.01)
*G02F 1/1335* (2006.01)
*G02B 26/02* (2006.01)
*G02B 26/00* (2006.01)
*G02B 5/128* (2006.01)
*G09G 3/34* (2006.01)

(52) U.S. Cl.
CPC .. *G02F 1/133526* (2013.01); *G02F 1/133553* (2013.01); *G02F 1/167* (2013.01); *G02B 5/128* (2013.01); *G02B 5/201* (2013.01); *G02B 26/005* (2013.01); *G02B 26/026* (2013.01); *G02F 2001/1678* (2013.01); *G09G 3/344* (2013.01)

(58) Field of Classification Search
CPC ............. G02B 26/026; G02F 1/133526; G02F 1/133553; G02F 1/167; G02F 2001/1678; G09G 3/344
USPC .......................................................... 359/230
See application file for complete search history.

(56) References Cited

U.S. PATENT DOCUMENTS

| | | | |
|---|---|---|---|
| 4,025,674 A | 5/1977 | Mizuochi | |
| 4,071,430 A | 1/1978 | Liebert | |
| 4,203,106 A | 5/1980 | Dalisa et al. | |
| 4,648,956 A | 3/1987 | Marhsall et al. | |
| 4,821,092 A | 4/1989 | Noguchi | |
| 5,019,748 A | 5/1991 | Appelberg | |
| 5,319,491 A | 6/1994 | Selbrede | |
| 5,359,346 A | 10/1994 | DiSanto | |
| 5,396,350 A | 3/1995 | Beeson et al. | |
| 5,596,671 A | 1/1997 | Rockwell, III | |
| 5,871,653 A | 2/1999 | Ling | |
| 5,959,777 A | 9/1999 | Whitehead | |
| 5,999,307 A | 12/1999 | Whitehead et al. | |
| 6,064,784 A | 5/2000 | Whitehead et al. | |
| 6,215,920 B1 | 4/2001 | Whitehead et al. | |
| 6,304,365 B1 | 10/2001 | Whitehead et al. | |
| 6,376,828 B1 | 4/2002 | Comiskey | |
| 6,377,383 B1 | 4/2002 | Whitehead et al. | |
| 6,384,979 B1 | 5/2002 | Whitehead et al. | |
| 6,437,921 B1 | 8/2002 | Whitehead | |
| 6,452,734 B1 | 9/2002 | Whitehead et al. | |
| 6,574,025 B2 | 6/2003 | Whitehead et al. | |
| 6,751,008 B2 | 6/2004 | Liang et al. | |
| 6,787,976 B2 | 9/2004 | Minoura et al. | |
| 6,822,783 B2 | 11/2004 | Matsuda et al. | |
| 6,842,279 B2 | 1/2005 | Amundson | |
| 6,865,011 B2 | 3/2005 | Whitehead et al. | |
| 6,885,496 B2 | 4/2005 | Whitehead et al. | |
| 6,891,658 B2 | 5/2005 | Whitehead et al. | |
| 7,046,439 B2 | 5/2006 | Kaminsky et al. | |
| 7,093,968 B2 | 8/2006 | Hsueh et al. | |
| 7,164,536 B2 | 1/2007 | Whitehead | |
| 7,170,670 B2 | 1/2007 | Webber | |
| 7,259,744 B2 * | 8/2007 | Arango | B41J 2/01 345/107 |
| 7,286,280 B2 | 10/2007 | Whitehead et al. | |
| 7,324,263 B2 | 1/2008 | Johnson et al. | |
| 7,422,964 B2 | 9/2008 | Akiyama | |
| 7,439,948 B2 | 10/2008 | Johnson et al. | |
| 7,454,103 B2 | 11/2008 | Parriaux | |
| 7,463,398 B2 | 12/2008 | Feenstra | |
| 7,507,012 B2 | 3/2009 | Aylward et al. | |
| 7,515,326 B2 | 4/2009 | Ibrede et al. | |
| 7,564,614 B2 | 7/2009 | Chen et al. | |
| 7,660,509 B2 | 2/2010 | Bryan et al. | |
| 7,740,387 B2 | 6/2010 | Schultz et al. | |
| 7,760,417 B2 | 7/2010 | Whitehead | |
| 7,775,700 B2 | 8/2010 | Lee | |
| 7,852,430 B1 | 12/2010 | Gettmey | |
| 7,940,457 B2 | 5/2011 | Jain et al. | |
| 8,022,615 B2 | 9/2011 | Bai et al. | |
| 8,040,591 B2 | 10/2011 | Whitehead | |
| 8,094,364 B2 | 1/2012 | Park | |
| 8,179,034 B2 | 5/2012 | Potts et al. | |
| 8,384,659 B2 | 2/2013 | Yeo et al. | |
| 8,587,512 B2 | 11/2013 | Hiji et al. | |
| 8,690,408 B2 | 4/2014 | Li | |
| 9,360,696 B1 * | 6/2016 | Ghali | G02F 1/13338 |
| 9,377,574 B2 | 6/2016 | Li | |
| 9,612,501 B2 | 4/2017 | Whitehead | |
| 2002/0063963 A1 | 5/2002 | Whitehead et al. | |
| 2002/0089735 A1 | 7/2002 | Albert et al. | |
| 2002/0171910 A1 | 11/2002 | Pullen et al. | |
| 2003/0038755 A1 | 2/2003 | Amundson et al. | |
| 2003/0067666 A1 | 4/2003 | Kawai | |
| 2003/0165016 A1 | 9/2003 | Whitehead et al. | |
| 2003/0179327 A1 | 9/2003 | Nonaka et al. | |
| 2003/0214697 A1 | 11/2003 | Duthaler et al. | |
| 2004/0136047 A1 | 7/2004 | Whitehead et al. | |
| 2004/0174584 A1 | 9/2004 | Whitehead et al. | |
| 2004/0177237 A1 | 9/2004 | Huppenthal et al. | |
| 2004/0179145 A1 | 9/2004 | Jacobsen et al. | |
| 2004/0239613 A1 | 12/2004 | Kishi | |
| 2005/0007000 A1 | 1/2005 | Chou et al. | |
| 2005/0068287 A1 | 3/2005 | Lin et al. | |
| 2005/0270439 A1 | 12/2005 | Weber et al. | |
| 2006/0056009 A1 | 3/2006 | Kombrekke et al. | |
| 2006/0148262 A1 | 7/2006 | Lee et al. | |
| 2006/0170330 A1 | 8/2006 | Disanto et al. | |
| 2006/0209418 A1 | 9/2006 | Whitehead | |
| 2006/0291034 A1 | 12/2006 | Patry et al. | |
| 2007/0008739 A1 | 1/2007 | Kim et al. | |
| 2007/0019434 A1 | 1/2007 | Lee | |
| 2007/0046623 A1 | 3/2007 | Song | |
| 2007/0047003 A1 | 3/2007 | Suwabe | |
| 2007/0091434 A1 | 4/2007 | Garner et al. | |
| 2007/0195231 A1 | 8/2007 | Kuribayashi et al. | |
| 2007/0195391 A1 | 9/2007 | Nishikawa et al. | |
| 2007/0263137 A1 | 11/2007 | Shigeta et al. | |
| 2007/0263291 A1 | 11/2007 | Whitehead | |
| 2008/0002247 A1 | 1/2008 | Nagato et al. | |
| 2008/0024432 A1 | 1/2008 | Lee et al. | |
| 2008/0030661 A1 | 2/2008 | Tung et al. | |
| 2008/0043184 A1 | 2/2008 | Tung et al. | |
| 2008/0174852 A1 | 7/2008 | Hirai et al. | |
| 2008/0203910 A1 | 8/2008 | Reynolds | |
| 2008/0204854 A1 | 8/2008 | Whitehead et al. | |
| 2008/0218845 A1 | 9/2008 | Murakami | |
| 2008/0219024 A1 | 9/2008 | Mi et al. | |
| 2008/0231960 A1 | 9/2008 | Van Gorkom et al. | |
| 2008/0266245 A1 | 10/2008 | Wilcox | |
| 2008/0266646 A1 | 10/2008 | Wilcox et al. | |
| 2008/0285282 A1 | 11/2008 | Karman et al. | |
| 2008/0297496 A1 | 12/2008 | Watson et al. | |
| 2008/0303994 A1 | 12/2008 | Jeng et al. | |
| 2008/0304134 A1 | 12/2008 | Ban | |
| 2009/0096745 A1 | 4/2009 | Sprague et al. | |
| 2009/0109172 A1 | 4/2009 | Lee et al. | |
| 2009/0141221 A1 | 6/2009 | Taguchi et al. | |
| 2009/0201565 A1 | 8/2009 | Bita et al. | |
| 2009/0201570 A1 | 8/2009 | Frazier et al. | |
| 2009/0207476 A1 | 8/2009 | Yanagisawa et al. | |
| 2009/0225398 A1 | 9/2009 | Duthaler et al. | |
| 2009/0231714 A1 | 9/2009 | Zhao et al. | |
| 2009/0244935 A1 | 10/2009 | Hsieh et al. | |
| 2009/0256810 A1 | 10/2009 | Pasquariello | |
| 2009/0262083 A1 | 10/2009 | Parekh | |
| 2009/0262414 A1 | 10/2009 | Whitehead | |
| 2009/0273746 A1 | 11/2009 | Uehara et al. | |
| 2009/0322669 A1 | 12/2009 | Bryning et al. | |
| 2010/0079843 A1 | 4/2010 | Derichs et al. | |
| 2010/0085627 A1 | 4/2010 | Whitehead | |
| 2010/0091224 A1 | 4/2010 | Cho et al. | |
| 2010/0118383 A1 | 5/2010 | Van Abeelen et al. | |
| 2010/0148385 A1 | 6/2010 | Balko et al. | |
| 2010/0172016 A1 * | 7/2010 | Park | G02F 1/167 359/296 |

(56) References Cited

U.S. PATENT DOCUMENTS

| | | |
|---|---|---|
| 2010/0225575 A1 | 9/2010 | Ishii et al. |
| 2010/0245375 A1 | 9/2010 | Rhodes |
| 2010/0253711 A1 | 10/2010 | Muroi |
| 2011/0007381 A1 | 1/2011 | Paolini, Jr. et al. |
| 2011/0032460 A1 | 2/2011 | Lee et al. |
| 2011/0043435 A1 | 2/2011 | Hebenstreit et al. |
| 2011/0051054 A1 | 3/2011 | Wang et al. |
| 2011/0085116 A1 | 4/2011 | Kim |
| 2011/0085232 A1 | 4/2011 | Werner et al. |
| 2011/0273906 A1 | 10/2011 | Nichol et al. |
| 2011/0279442 A1 | 11/2011 | Hage et al. |
| 2011/0299014 A1 | 12/2011 | Jang et al. |
| 2011/0304902 A1 | 12/2011 | Yeo et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0062981 A1 | 3/2012 | Komatsu et al. |
| 2012/0069064 A1 | 3/2012 | Yamakita |
| 2012/0081777 A1 | 4/2012 | Heikenfeld et al. |
| 2012/0113367 A1 | 5/2012 | Kitson et al. |
| 2012/0113499 A1 | 5/2012 | Komatsu |
| 2012/0262496 A1* | 10/2012 | Swic .................. G09G 3/344 345/690 |
| 2012/0287380 A1 | 11/2012 | Hagiwara et al. |
| 2012/0293857 A1 | 11/2012 | Kwon et al. |
| 2013/0050806 A1 | 2/2013 | Yasui et al. |
| 2013/0077284 A1 | 3/2013 | Chang et al. |
| 2013/0135320 A1 | 5/2013 | Govil |
| 2013/0155723 A1 | 6/2013 | Coleman |
| 2013/0182311 A1 | 7/2013 | Mochizuki et al. |
| 2013/0278995 A1 | 10/2013 | Drzaic et al. |
| 2013/0334972 A1 | 12/2013 | Atkins |
| 2014/0049448 A1 | 2/2014 | Christensen |
| 2014/0063586 A1 | 3/2014 | Jung et al. |
| 2014/0160185 A1 | 6/2014 | Okuno et al. |
| 2014/0333989 A1 | 11/2014 | Whitehead |
| 2014/0340376 A1 | 11/2014 | Itagaki et al. |
| 2015/0146273 A1 | 5/2015 | Whitehead |
| 2015/0234250 A1 | 8/2015 | Lin et al. |
| 2016/0026061 A1 | 1/2016 | O'Keeffe |
| 2016/0097961 A1 | 4/2016 | Whitehead |
| 2016/0116815 A1 | 4/2016 | Whitehead |
| 2016/0139478 A1 | 5/2016 | Whitehead et al. |
| 2016/0147128 A1 | 5/2016 | Loxley et al. |
| 2016/0155399 A1 | 6/2016 | Tripathi et al. |
| 2016/0216561 A1 | 7/2016 | Lee et al. |
| 2016/0246155 A1 | 8/2016 | Loxley et al. |
| 2016/0274435 A1 | 9/2016 | Whitehead |
| 2016/0349592 A1 | 12/2016 | Goulding et al. |
| 2016/0363811 A1 | 12/2016 | Zhong et al. |
| 2016/0377950 A1 | 12/2016 | Zhang |
| 2017/0068145 A1 | 3/2017 | Nakamura et al. |
| 2017/0075184 A1 | 3/2017 | Low et al. |
| 2017/0160444 A1 | 6/2017 | Sadlik |
| 2017/0160448 A1 | 6/2017 | Whitehead |
| 2017/0160620 A1 | 6/2017 | Whitehead |
| 2017/0287406 A1 | 10/2017 | Whitehead |
| 2017/0299935 A1 | 10/2017 | Whitehead |
| 2018/0017838 A1 | 1/2018 | Thomas |
| 2018/0031941 A1 | 2/2018 | Goulding |
| 2018/0157144 A1 | 6/2018 | Sadlik |
| 2018/0173074 A1 | 6/2018 | Zhang |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1308734 A | 8/2001 |
| CN | 1173208 C | 10/2004 |
| CN | 1639625 A | 7/2005 |
| CN | 101160547 A | 4/2008 |
| CN | 1454327 A | 9/2008 |
| CN | 102955318 A | 3/2013 |
| CN | 103207495 A | 7/2013 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 2004085635 | 3/2004 |
| JP | 2007505330 | 3/2007 |
| JP | 3965115 | 6/2007 |
| JP | 2007279641 | 10/2007 |
| JP | 4113843 | 4/2008 |
| JP | 2009251215 | 10/2009 |
| JP | 4956610 | 3/2012 |
| JP | 2005519329 | 6/2017 |
| KR | 100949412 | 3/2010 |
| TW | 201024886 A | 7/2010 |
| WO | 2003075085 | 9/2003 |
| WO | 2005010604 | 2/2005 |
| WO | 2006108285 | 10/2006 |
| WO | 2006114743 | 11/2006 |
| WO | 2008103554 A1 | 8/2008 |
| WO | 2012021121 A1 | 2/2012 |
| WO | 2014092729 A1 | 6/2014 |
| WO | 2014146937 | 9/2014 |
| WO | 2014160552 A1 | 10/2014 |
| WO | 2014189751 A1 | 11/2014 |
| WO | 2015005899 A2 | 1/2015 |
| WO | 2015061538 A1 | 4/2015 |
| WO | 2015116913 | 8/2015 |
| WO | 2015175518 | 11/2015 |
| WO | 2016057613 A1 | 4/2016 |
| WO | 2016085835 A1 | 6/2016 |
| WO | 2016109273 A1 | 7/2016 |
| WO | 2016130720 | 8/2016 |
| WO | 2007072355 A2 | 6/2017 |
| WO | 2017100157 A1 | 6/2017 |
| WO | 2017105443 A1 | 6/2017 |
| WO | 2017147449 A1 | 8/2017 |
| WO | 2017205312 A1 | 11/2017 |
| WO | 2017040628 A1 | 3/2018 |

OTHER PUBLICATIONS

International Search Report and Written Opinion dated Apr. 21, 2016 for PCT Application No. PCT/US2016/017416.
International Search Report and Written Opinion dated Mar. 1, 2016 for PCT Application No. PCT/US2015/013725.
International Search Report and Written Opinion dated Jan. 27, 2016 for PCT Application No. PCT/US2015/054385.
International Search Report and Written Opinion dated Mar. 2, 2016 for PCT Application No. PCT/US2015/062075.
Mossman, M. A. et al., "A Novel Reflective Image Display Using Total Internal Reflection" Displays Devices, Dempa Publications, Tokyo JP vol. 25, No. 5 Dec. 1, 2004 pp. 215-221.
European Patent Search Report dated Dec. 5, 2016 for EP Application No. 14800994.7.
International Search Report and Written Opinion dated Jul. 8, 2014 for PCT Application No. PCT/US2013/049606.
International Search Report and Written Opinion dated Dec. 30, 2014 for PCT Application No. PCT/US2014/058118.
International Search Report and Written Opinion dated Aug. 11, 2014 for PCT Application No. PCT/US2014/030966.
International Search Report and Written Opinion dated Sep. 19, 2014 for PCT Application No. PCT/US2014/038091.
International Search Report and Written Opinion dated Oct. 1, 2015 for PCT Application No. PCT/US2015/030349.
International Search Report and Written Opinion dated Apr. 3, 2015 for PCT Application No. PCT/US2014/061911.
International Search Report and Written Opinion dated Mar. 28, 2016 for PCT Application No. PCT/US2015/0066150.
Gou, S. et al., "Transparent Superhydrophobic Surfaces for Applications of Controlled Reflectance" Applied Optics vol. 51, Issue No. 11, Apr. 10, 2012, pp. 1645-1653.

(56) References Cited

OTHER PUBLICATIONS

Whitehead, L. et al., "The Many Roles of Illumination in Information Display" Society for Information Display Symposium (Invited Paper), Issue No. 0097-966X/06/3701-0000, May 2010.
Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.
Whitehead, L. et al., "Reflections on Total Internal Reflection" Optics and Photonics News Feb. 2009, pp. 28-34.
Mossman, M. et al., "Observations of Total Internal Reflection at a Natural Super-Hydrophobic Surface" Physics in Canada vol. 64, Issue No. 1, Mar. 2008, pp. 7-11.
Hrudey, P. et al., "Application of Transparent Nanostructured Electrodes for Modulation of Total Internal Reflection" SPIE 2007 Conference Paper No. 6647 Aug. 2007, pp. 1-12.
Hrudey, P. et al., "Variable Diffraction Gratings Using Nanoporous Electrodes and Electrophoresis of Dye Ions" SPIE 2007 Conference Paper No. 6645 Aug. 2007, pp. 1-12.
Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.
Mossman, M. et al., "Off the Beaten Path with Total Internal Reflection" International Optical Design Conference (Invited Paper), Jun. 2006, pp. 1-12.
Whitehead, L. et al., "Total Internal Reflection for Illumination and Displays" SPIE Newsroom Sep. 7-8, 2006.
Mossman, M. et al., "Controlled Frustration of TIR by Electrophoresis of Pigment Particles" Applied Optics vol. 44, Issue No. 9, Mar. 20, 2005, pp. 1601-1609.
Kwong, V. et al., "Control of Reflectance of Liquid Droplets by Means of Electrowetting" Applied Optics vol. 43, Issue No. 4, Feb. 1, 2004, pp. 808-813.
Mossman, M. et al. "A High Reflectance, Wide Viewing Angle Reflective Display Using Total Internal Reflection in Mirco-Hemispheres" International Display Research Conference, Issue No. 1083-1312/00/2003-0233, Sep. 2003, pp. 233-236.
Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.
Coope, R. et al., "Modulation of Retroreflection by Controlled Frustration of Total Internal Reflection" Applied Optics vol. 41, Issue No. 25, Sep. 1, 2002, pp. 5357-5361.
Mossman, M. et al., "New Method for Maintaining Long Term Image Quality in a TIR Based Electrophoretic Display" International Display Research Conference, Nice, France, Eurodisplay Oct. 2002, pp. 851-854.
Mossman, M. et al., "New Reflective Color Display Technique Based on Total Internal Reflection and Subtractive Color Filtering" International Conference of the Society for Information Display, San Jose, CA Issue No. 1-0966X/01/3201-1054, Jun. 2001, pp. 1054-1057.
Whitehead, L. et al., "Visual Applications of Total Internal Reflection in Prismatic Microstructures" Physics in Canada Nov./Dec. 2001, pp. 329-335.
Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.
Mossman et al. "Brightness Enhancement in TIR-Modulated Electrophoretic Reflective Image Displays", (Biblio).
Atsuhito et al. "Electrophoresis Device, Method of Manufacturing the Electrophoresis Device, Display, Display Substrate, and Electronic Unit", (Abstract).
Kambe, N. et al., "Refractive Index Engineering of nano-Polymer Composites," Symposium, Apr. 20, 2001, 6 pages, Materials Research Society Symposium Proceedings, Pittsburgh, PA.
Robben, B. et al., "Electrodynamics of Electronic Paper Based on Total Internal Reflection," Journal, Sep. 20, 2018, pp. 034041-1-034041-11, DOI 10.1103/PhysRevApplied.10.034041, America Physical Society.

\* cited by examiner

US 10,203,436 B2

METHOD AND APPARATUS FOR IMPROVED COLOR FILTER SATURATION

RELATED APPLICATIONS

This application claims priority to Application No. PCT/US14/38091, filed May 15, 2014, under 35 U.S.C. § 371 (U.S. National Stage) which claimed the filing date benefit of U.S. Provisional Application No. 61/826,236, filed on May 22, 2013. The disclosure of each application is incorporated herein in its entirety.

FIELD

This disclosure relates to a method and apparatus for improved color filter saturation. More specifically, the disclosure relates to enhanced reflective displays to produce images having a white appearance through total internal reflection.

BACKGROUND

Semi-retro-reflection refers to a reflection property of an approximately macroscopically planar structure wherein the planar structure reflects a substantial fraction of the light that strikes it, and does so with a special directional characteristic, especially for incident light that is within a range of directions deviating by less than approximately 45 degrees from the direction perpendicular to the macroscopically planar structure. The special directional characteristic is that for each incident light ray, the reflected light propagates backward in approximately the reverse direction, in other words, back towards the point of origin, with a deviation from the reverse direction that is macroscopically random and primarily less than a predetermined maximum deviation, wherein the predetermined maximum deviation being less than approximately 45 degrees. This semi-retro-reflection exhibits what is often called "optical gain", meaning that it increases the apparent reflectance of the surface under common illumination and viewing conditions. Furthermore, the manner in which light is reflected from this structure results in a paper-like white appearance. A paper-like white appearance is generally preferable to the metallic luster normally observed in optical systems that exhibit optical gain.

A semi-retro-reflective characteristic can be approximated in a reflective display incorporating an array of convex or hemi-spherical protrusions or hemi-spheres (it should be noted that the terms "convex protrusions" and "hemi-spherical protrusions" and "hemi-spheres" will henceforth be used interchangeably). Depicted in FIG. 1 is a front sheet 100 of a reflective display with an outward front surface 102 facing the viewer and an inward surface 104 comprising of a plurality of hemi-spherical protrusions 106 which reflects light by means of total internal reflection (TIR) within the individual hemi-spheres 108. Typically only about half of the incident light rays on sheet 100 are totally internally reflected, impeding attainment of a white appearance, as depicted in enlarged detail of a portion of a hemi-spherical array in FIG. 2. In the FIG. 2 example, the incident light rays 110 (depicted as solid lines) are either totally internally reflected and emerge as reflected light rays 112 (depicted as dotted lines) back towards the viewer or they pass through the dark pupil region as non-totally reflected light rays 114. The incident light rays 110 deviate by about 30 degrees from the perpendicular direction, which represents a typical operating condition where high quality semi-retro-reflection is desired but not achieved due to the large fraction of light rays 114 that do not undergo total internal reflection within the hemi-spheres largely due to passing through the non-reflective dark pupil region as previously explained, for example, in U.S. Pat. No. 6,885,496.

One approach to recovering a substantial portion of the light rays 114 that pass through the dark pupil region is to place a planar reflective element 116 beneath the hemi-spherical array as shown in FIG. 3 to improve reflectivity. However, although the planar reflector is able to cause most incident light rays 110 (depicted as solid lines) to undergo net reflection, most light rays reflected by the planar reflector do not have the desired semi-retro-reflection characteristic and emerge as light rays 118 (depicted as dotted lines) that instead are reflected away from the viewer and the source of incident light. High optical gain can be achieved by the system shown in FIG. 3 if the incident light rays are incident perpendicular to the hemispherical array's planar outward surface, but this has limited usefulness in practice.

Another approach to reflecting light rays that pass through the dark pupil regions of the individual convex or hemi-spherical protrusions as shown in FIG. 2 but in a semi-retro-reflective manner is to place a reflective element beneath the hemi-spherical array such that it reflects the light substantially back towards the direction of origin of the light rays. This may be achieved by a reflective element which incorporates an array of approximately spherical indentations. The approximately spherical indentations each has a radius of curvature that substantially coincides with the center of curvature of the hemi-sphere located directly above it. The invention described in this application is directed to "recycling" of such light rays in a semi-retro-reflective manner to enhance the brightness in TIR-based displays. Furthermore, the invention described enables high efficiency and high color saturation in a reflective color display comprising of a color filter array.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
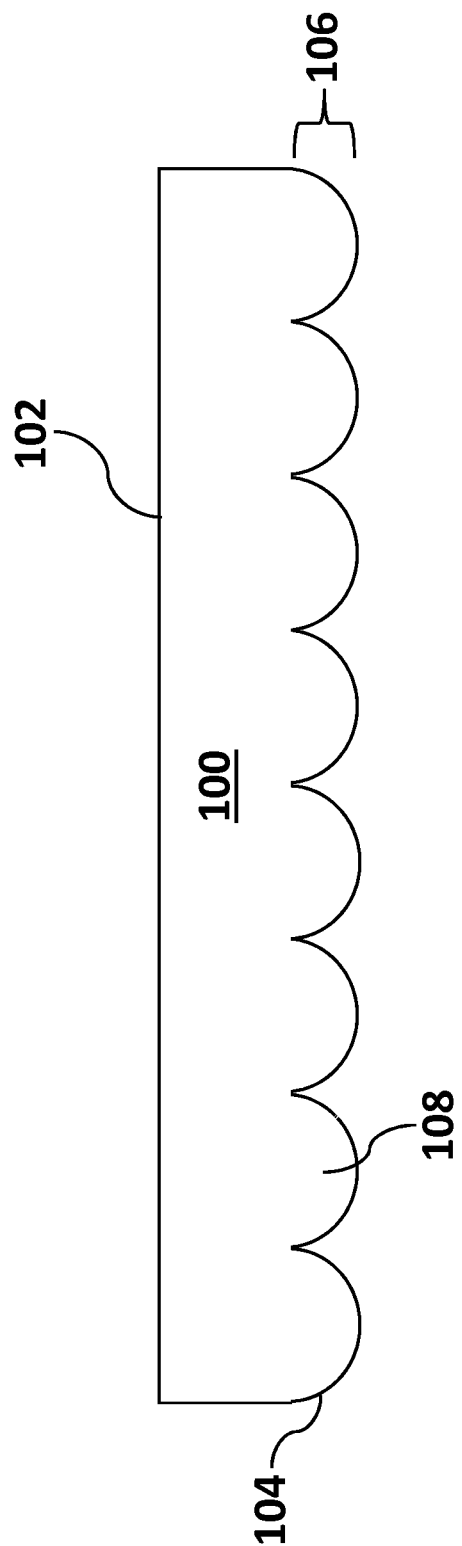
FIG. 1 illustrates a portion of an array of hemi-spherical protrusions.
Figure 2:
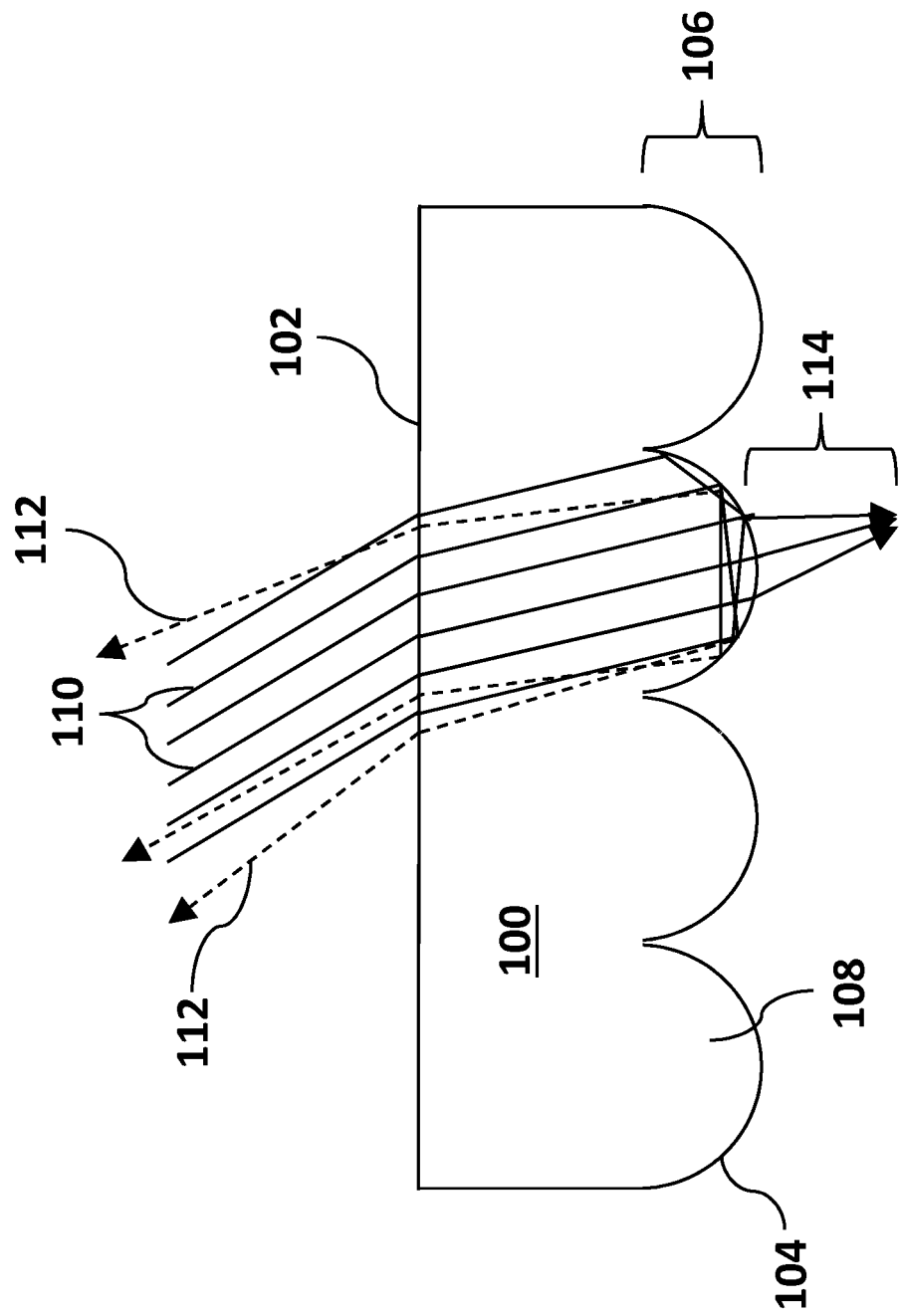
FIG. 2 illustrates an array of hemi-spherical protrusions exhibiting how a portion of incident light rays are totally internally reflected and a portion that are not reflected and pass through the dark pupil region of the individual hemi-spherical protrusions.
Figure 3:
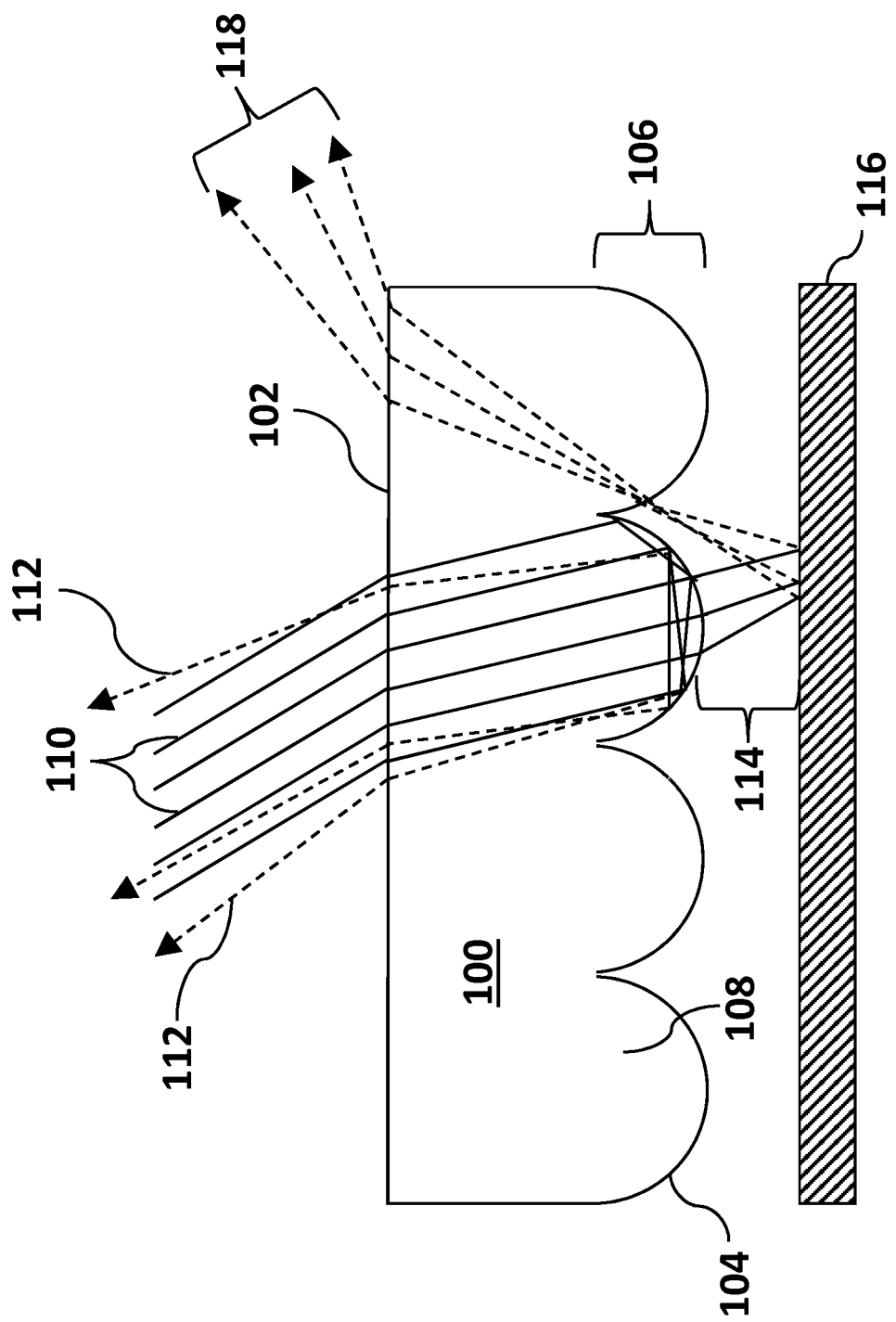
FIG. 3 illustrates a reflective structure comprising of an array of hemi-spherical protrusions exhibiting how the portion of incident light rays that are not reflected and pass through the dark pupil region of the individual hemi-spherical protrusions are reflected with a planar reflective element.
Figure 4:
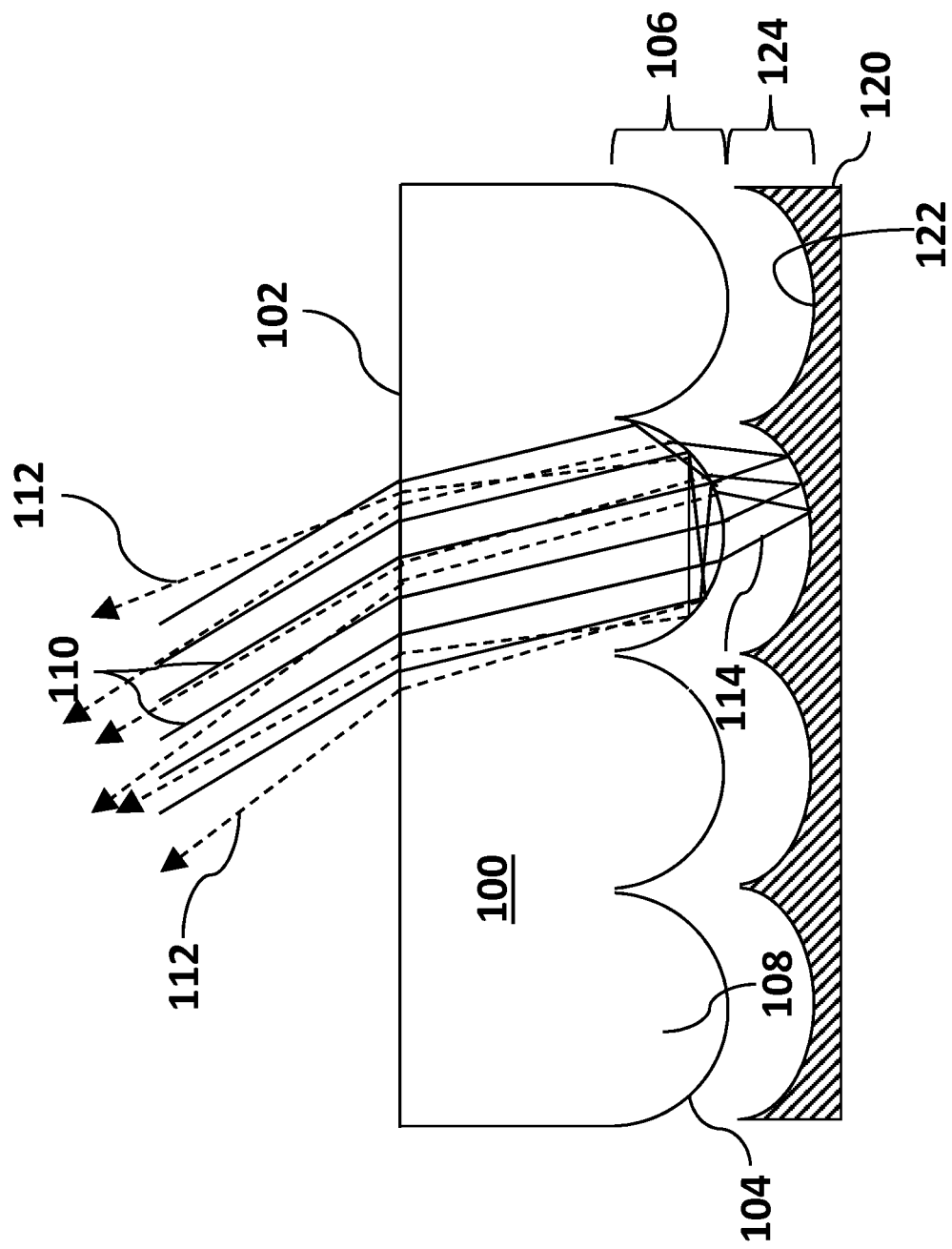
FIG. 4 illustrates a reflective structure comprising of an array of hemi-spherical protrusions exhibiting how the portion of incident light rays that are not reflected and pass through the dark pupil region of the individual hemi-spherical protrusions are retro-reflected with a reflective element comprising of a plurality of spherical indentations.

FIG. 4 depicts a reflective structure described herein in which a reflective element placed beneath the hemi-spherical array incorporates an array of approximately spherical indentations illustrating how light rays that pass through the dark pupil regions are semi-retro-reflected. FIG. 4 depicts a transparent sheet 100 with an outward surface 102 facing the viewer and an inward surface 104 opposite the viewer. Sheet 100 is further comprised of a plurality of convex protrusions or hemi-spherical protrusions or hemi-spheres 106 which reflects light by means of total internal reflection (TIR) within the individual hemi-spheres 108. Hemi-spheres 108 may also be hemi-spherical beads or hemi-beads. The reflective structure in FIG. 4 is further comprised of reflective element 120 with a reflective surface 122 placed behind sheet 100 and adjacent surface 104. Reflective element 120 is comprised of a plurality of spherical indentations 124, each of which has a radius of curvature that substantially coincides with the center of curvature of the hemi-sphere located directly above it. The ratio of the two radii of curvature influences the degree of angular deviation associated with the retro-reflection (where (radius of curvature of a spherical indentation)/(radius of curvature of a hemisphere)). Incident light rays 110 (depicted as solid lines) that pass through sheet 100 typically are totally internally reflected at the surface 104 of the hemi-spherical protrusions 108 about half of the time and are retro-reflected predominantly but not necessarily directly back towards the light source as seen in emerged light rays 112 (depicted as dotted lines). The remaining light rays that are not totally internally reflected 114 pass through the dark pupil of the individual hemi-spherical protrusions 108 and are semi-retro-reflected at the contoured surface 122 of the reflective element comprising of the plurality of spherical indentations 124. Unlike a planar reflective element described in FIG. 3 where light rays 118 are reflected away from the light source when the direction of the incident light rays is in a non-perpendicular direction to the surface of said planar reflective element, instead light rays 114 are substantially directed back towards the hemi-sphere by which they originated and emerge as light rays 112 directed towards the light source in a semi-retro-reflective manner. These light rays combine with the totally internally reflected light rays to enhance the reflectivity.

Figure 5:
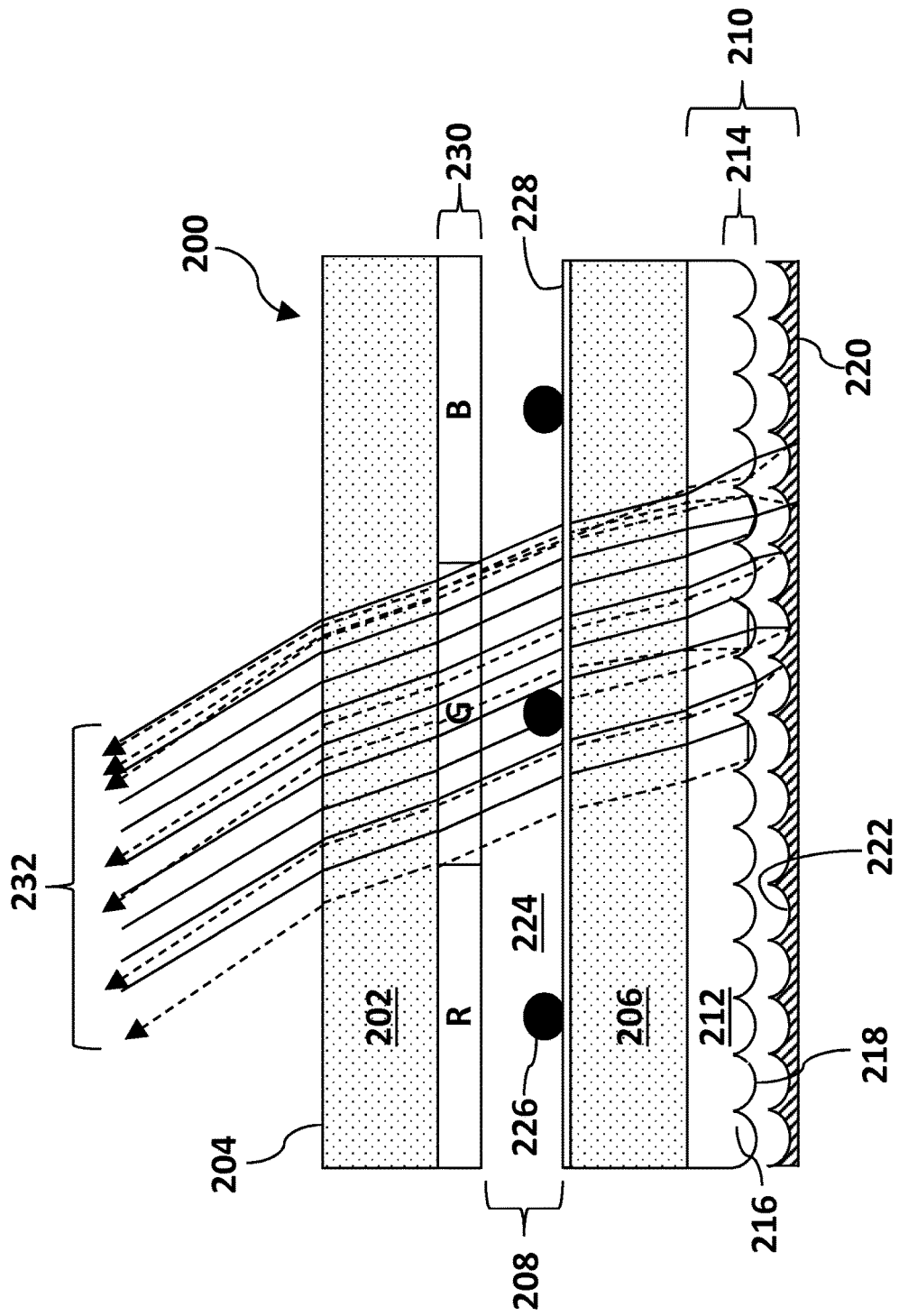
FIG. 5 illustrates a portion of a reflective display in the light reflecting (i.e. white) state incorporating a reflective element comprising of a plurality of spherical indentations.

The structure described in FIG. 4 can be incorporated into a reflective display to enhance the reflectance and apparent brightness of the display. FIG. 5 embodiment depicts incorporation of a reflective structure depicted in FIG. 4 into a reflective display. Display 200 in FIG. 5 is comprised of a transparent front sheet 202 composed of, for example, glass or a polymer with an outer surface 204 facing the viewer. Display 200 further comprises a second transparent sheet 206 composed of, for example, glass or a polymer which forms a cavity 208 wherein said cavity comprises an optical modulation layer. On the opposite side of sheet 206 from cavity 208 is a rear reflective structure 210 similar to that described in FIG. 4. Reflective structure 210 is comprised of a transparent sheet 212 further comprised of a plurality of convex protrusions or hemi-spherical protrusions (i.e. hemi-spheres) 214 which reflects light by means of total internal reflection (TIR) within the individual hemi-spheres 216. The plurality of hemi-spheres 214 forms a contoured surface 218 wherein a reflective element 220 comprising of a plurality of spherical indentations with reflective surface 222 is placed adjacent. In one embodiment the ratio of the two radii of curvature is about 0.5 to 5 (where (radius of curvature of the spherical indentation)/(radius of curvature of a hemisphere) ≈0.5-5). In another embodiment the ratio of the two radii of curvature is about 1 to 3. In another embodiment the ratio of the two radii of curvature is about 1 to 2. Though not shown, the display 200 in FIG. 5 may further comprise an optional front light.

The optical modulating layer 208 of display 200 in FIG. 5 allows or prevents incident light from passing through sheet 206 towards the rear reflective element 214. The optical modulating layer may be comprised of an optical shutter based on any number of techniques that do not rely on polarization of reflected light such as, but not limited to, micro-electromechanical system (MEMS), electro-wetting system or electrophoretically mobile particles or a combination thereof. Display 200 depicts an optical modulating layer comprising of a liquid medium 224 with suspended electrophoretically mobile particles 226. Within cavity 208 and located on the front surface of transparent sheet 206 is an electrode layer 228 that may be comprised of a thin film transistor array, patterned electrode array or a combination thereof. Electrode layer 228 in combination with a voltage source (not shown) controls the optical modulation layer. It may be envisioned that the electrode layer could also be located on the rear surface of the color filter layer adjacent to liquid medium 224. Display 200 further comprises an optional color filter array layer 230 further comprised of red, green and blue sub-pixels denoted R, G and B, respectively in FIG. 5. Alternatively, the sub-pixels could be composed of cyan, magenta and yellow.

As depicted in display 200 in FIG. 5, the optical modulation layer is set to transmit light. A voltage of appropriate polarity is applied such that the electrophoretically mobile particles 226 localize or group at specific locations at the electrode layer 228 such that they allow incident and reflected light rays 232 to pass. Incident light rays are depicted by the solid lines and the reflected light rays by the dotted lines. Light rays that pass through the several layers of display 200 either totally internally reflect at the convex protrusion or hemi-spherical array 214 or pass through the dark pupil regions of the individual hemi-spheres 216. The light rays that pass through the dark pupils are retro-reflected at the surface 222 of reflective element 220 such that the light rays are substantially reflected back towards the viewer from the direction by which they came (i.e. origin) thus enhancing the apparent brightness of the display.

The depiction shown in FIG. 5 illustrates an important property of the overall design described herein. Not only does it achieve high efficiency (i.e. high reflectivity of incident light rays) but the retro-reflection characteristic causes the incident light that is shown passing through the green sub-pixel filter to return substantially through the same green sub-pixel filter in the color filter layer 230 and back towards the direction of the incident light. This is critical to achieve high efficiency and high color saturation in a reflective color display. The reflective structure 210 facilitates production of a bright, white, paper-like appearance while efficiently enabling color filters to yield saturated color. These characteristics are preserved over a wide range of incident viewing angles, providing an excellent ergonomic viewing characteristic.

Figure 6:
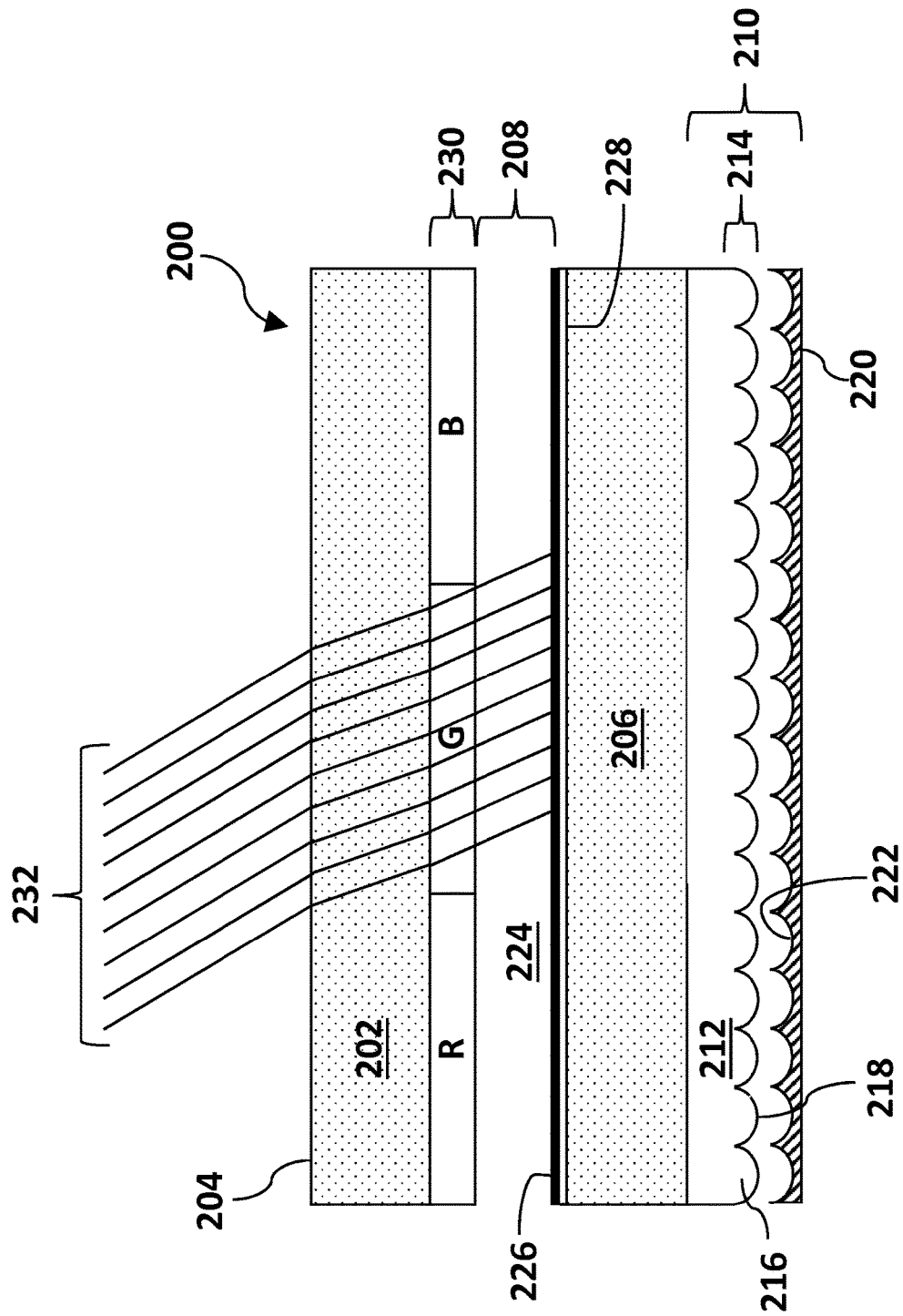
FIG. 6 illustrates a portion of a reflective display in the light absorbing (i.e. dark) state incorporating a reflective element comprising of a plurality of spherical indentations.

As depicted in display 200 in FIG. 6, the optical modulation layer comprising of a liquid medium 224 containing suspended electrophoretically mobile particles 226 is set to prevent transmission of light. In this example, the particles are delocalized into a substantially uniform layer onto the electrode layer 228 by application of an electric field of appropriate polarity such that incident light rays 232 that pass through the outer transparent sheet 202 and the optional color filter layer 230 are absorbed by the layer of particles 226 preventing light being reflected back resulting in a dark state of the display. Alternatively, one could envision the electrode layer 228 being located on the inward surface of the color filter layer 230 in display 200.

In the display embodiments described herein, they may be used in applications such as in, but not limited to, electronic book readers, portable computers, tablet computers, wearables, cellular telephones, smart cards, signs, watches, shelf labels, flash drives and outdoor billboards or outdoor signs.

Embodiments described above illustrate but do not limit this application. While a number of exemplary aspects and embodiments have been discussed above, those of skill in the art will recognize certain modifications, permutations, additions and sub-combinations thereof. Accordingly, the scope of this disclosure is defined only by the following claims.

What is claimed is:

1. A totally internally reflective display with a brightness enhancing structure, the display comprising:
   a first optically transparent sheet;
   at least one electrode layer;
   a second optically transparent sheet having a surface further comprising of a plurality of convex or hemi-spherical protrusions, each of the convex or hemi-spherical protrusions having a dark pupil region;
   a reflection enhancing layer that substantially semi-retro-reflects an incoming ray of light that passes through the dark pupil regions of the convex or hemi-spherical protrusions;
   at least one optical modulation layer wherein light is prevented or allowed to pass, the optical modulation layer including a cavity having one or more electrophoretic particles suspended in a medium; and
   a voltage source to controllably modulate the optical layer;
   wherein the outgoing light ray is substantially parallel to the incoming light ray.

2. A reflective display according to claim 1, wherein the voltage source is switchable to:
   apply a voltage across the optical modulation layer of one polarity to allow light to pass; and
   apply a voltage across the optical modulation layer of a second polarity to prevent light from passing.

3. The reflective display according to claim 2, wherein the reflection enhancing layer comprises an array of approximately spherical indentations, whereby each spherical indentation further comprises a radius of curvature that substantially coincides with the center of curvature of the convex or hemi-spherical protrusion located substantially above the array of approximately spherical indentations.

4. The reflective display according to claim 3, wherein the ratio of the radius of curvature of a spherical indentation to the radius of curvature of a hemi-spherical protrusion is about 0.5 to 5.

5. The reflective display according to claim 3, wherein the ratio of the radius of curvature of a spherical indentation to the radius of curvature of a hemi-spherical protrusion is about 1 to 3.

6. The reflective display according to claim 3, wherein the ratio of the radius of curvature of a spherical indentation to the radius of curvature of a hemi-spherical protrusion is about 1 to 2.

7. The reflective display according to claim 3, wherein the optical modulating layer is comprised of an electrophoretic medium further comprised of a plurality of suspended electrostatically charged light absorbing electrophoretically mobile particles.

8. The reflective display according to claim 3, wherein the optical modulating layer is comprised of an electro-wetting system.

9. The reflective display according to claim 3, wherein the optical modulating layer is comprised of a micro-electro-mechanical system.

10. The reflective display according to claim 7, wherein:
    movement of the electrophoretically mobile particles by application of a voltage of one polarity creates a light state; and
    movement of the electrophoretically mobile particles by application of a voltage of a second polarity creates a dark state.

11. The reflective display according to claim 1, further comprising a color filter array comprised of red, green and blue sub-pixels.

12. The reflective display according to claim 1, further comprising a color filter array comprised of cyan, magenta and yellow sub-pixels.

13. The reflective display according to claim 1, wherein at least one electrode layer comprises a thin film transistor array.

14. The reflective display according to claim 1, wherein at least one electrode layer comprises a patterned array.

15. The reflective display according to claim 1, further comprising spacers or spacer beads.

16. The reflective display according to claim 7, wherein the electrophoretically mobile particles are comprised of an organic material or an inorganic material or a combination of an inorganic and organic material.

17. The reflective display according to claim 7, wherein the electrophoresis medium is comprised of a hydrocarbon or a fluorocarbon or a combination of a hydrocarbon and fluorocarbon.

18. The reflective display according to claim 1, wherein the optically transparent sheet having a surface comprising of a plurality of convex protrusions or hemi-spherical protrusions may be formed by any one of embossing, etching, molding, self-assembly, printing, lithography or micro-replication.

19. The reflective display according to claim 3, wherein the reflection enhancing layer comprised of a plurality of spherical indentations may be formed by any one of embossing, etching, molding, self-assembly, printing, lithography or micro-replication.

20. The reflective display according to claim 1, further comprising a front light.

21. An electronic book reader, portable computer, tablet computer, wearable, cellular telephone, smart card, sign, watch, shelf label, flash drive, outdoor billboards or outdoor signs comprising a display according to claim 1.

* * * * *